No. 640,215.  
W. W. MILLER.  
GRAIN DRILL.  
(Application filed May 14, 1898. Renewed Mar. 1, 1899.)
(No Model.)  
2 Sheets—Sheet 2.
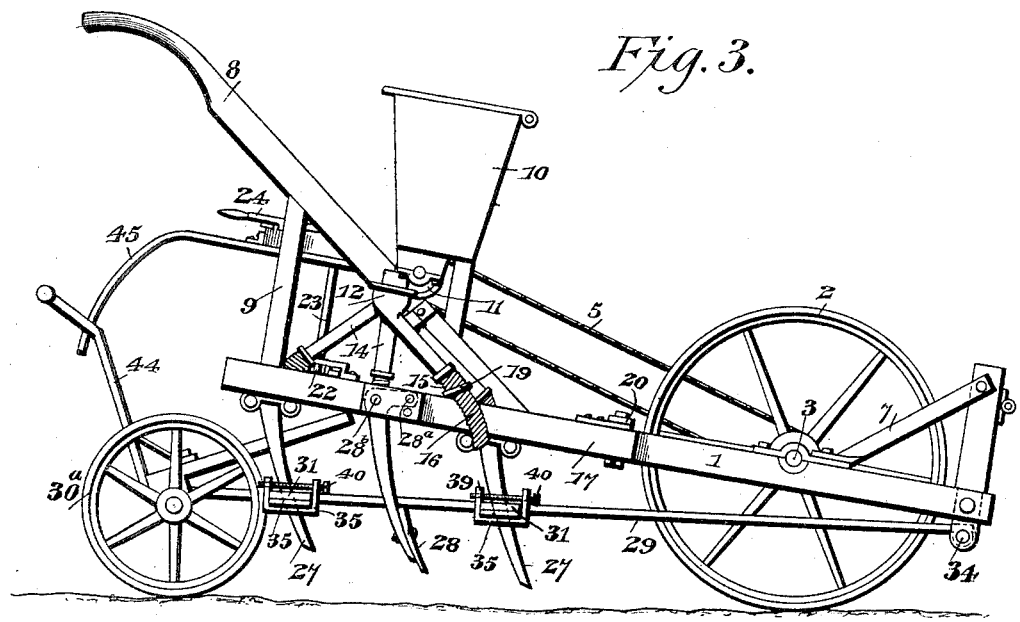
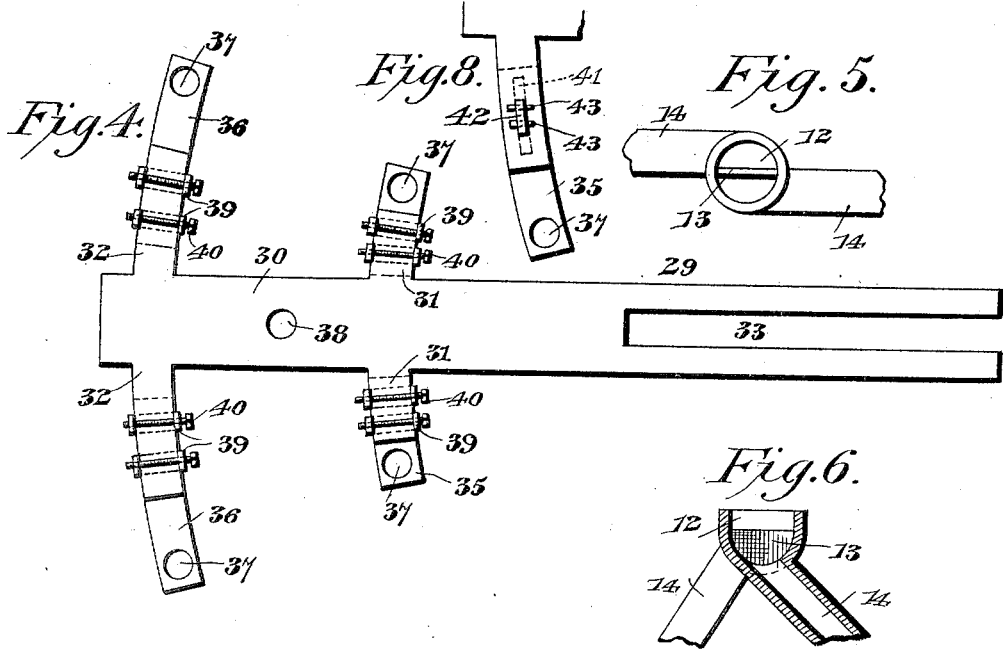
Witnesses  
Jas. K. McCathran  
H. F. Beukert
Wilson W. Miller, Inventor  
By his Attorneys.  
C. A. Snow & Co.

No. 640,215. Patented Jan. 2, 1900.
W. W. MILLER.
GRAIN DRILL.
(Application filed May 14, 1898. Renewed Mar. 1, 1899.)
(No Model.) 2 Sheets—Sheet 1.
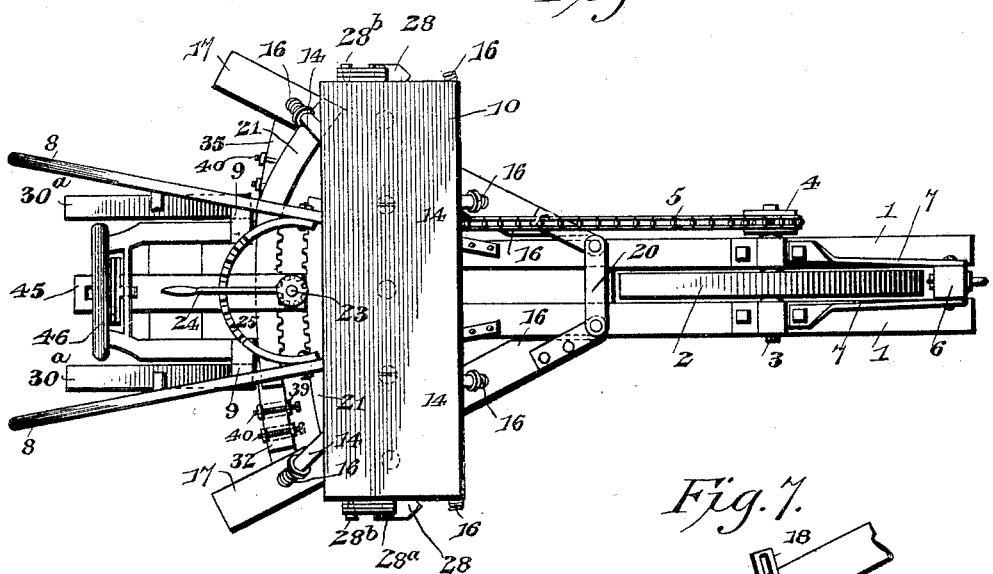
Fig. 1.
Fig. 7.
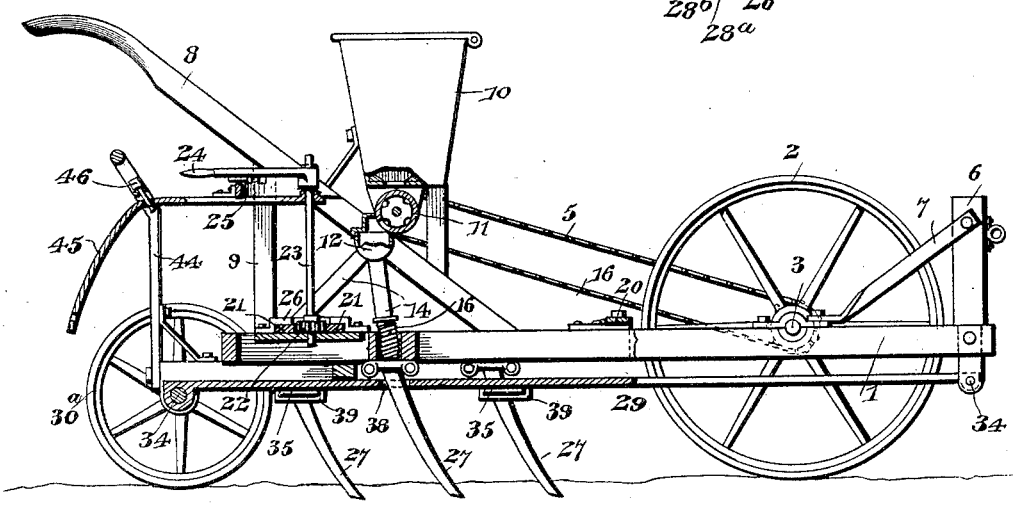
Fig. 2.
Witnesses
Jas. K. McCathran
H. F. Beinhard
Wilson W. Miller, Inventor
By his Attorneys,
C. A. Snow & Co.

UNITED STATES PATENT OFFICE.

WILSON W. MILLER, OF SAXMAN, KANSAS.

GRAIN-DRILL.

SPECIFICATION forming part of Letters Patent No. 640,215, dated January 2, 1900.

Application filed May 14, 1898. Renewed March 1, 1899. Serial No. 707,393. (No model.)

*To all whom it may concern:*

Be it known that I, WILSON W. MILLER, a citizen of the United States, residing at Saxman, in the county of Rice and State of Kansas, have invented a new and useful Grain-Drill, of which the following is a specification.

This invention has for its object to devise a machine for sowing wheat and like grain in drills in and between rows of corn, so as to utilize all available ground and secure the largest crop possible under favorable conditions. It is common to sow wheat and like grain between rows of corn; but a space of about twelve inches is generally left in which no grain is planted, said space corresponding to and being in line with the rows of cornstalks. The present machine is constructed with especial reference to utilizing this space and to sowing the seed in line with the stalks, thereby avoiding the objection as to waste of land, which in a large field amounts to considerable.

The invention also has for its object to provide simple and effective means for varying the width of the machine, so as to adapt it to the distance between the rows of cornstalks, said means being at all times under control, so that the spread of the machine can be changed without requiring a stopping of the planter to effect the adjustment and loosen and tighten working parts.

A further purpose of the improvement is to facilitate the clearing of the shovels from leaves, trash, and the like and to render positive the action of freeing such accumulations from the shovels.

The invention also has for its object to improve the general construction of this class of machines and increase their capabilities, lighten the draft, obviate disabling of the machine when the shovels or grain-tubes strike obstacles, and to provide an implement for the purposes aforesaid which will be easy of operation, capable of adjustment to meet various conditions, and perform the required work in a rapid and satisfactory manner.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a planter especially designed for attaining the objects of this invention. Fig. 2 is a side elevation, parts being broken away. Fig. 3 is a detail view in elevation of the main and clearer frames, showing their relation when the main frame is elevated to clear the shovels of foreign matter. Fig. 4 is a top plan view of the clearer-frame. Fig. 5 is a top plan view of a grain-cup. Fig. 6 is a detail section of the parts illustrated in Fig. 5. Fig. 7 is a detail view showing the means for connecting a shovel and a grain-tube to a beam. Fig. 8 is a fragmentary detail view showing a modified construction of the means for attaching the adjustable hoe or drill-slide to the clearer-frame.

Corresponding and like parts are referred to in the following description and indicated in the several views of the accompanying drawings by the same reference characters.

The main frame of the machine comprises longitudinal beams 1, arranged in parallel relation and spaced apart and connected at their ends and intermediate of their extremities. A ground-wheel 2 is secured to an axle 3, journaled in bearings applied to the beams 1, near their front ends, said axle having a sprocket-wheel 4 at one end, around which passes the drive-chain 5 for transmitting motion to the seeding mechanism. A vertical post 6 is secured between the front ends of the beams 1 and is stayed by braces 7, which connect at their upper forward ends with the upper portion of the post and at their rear ends with the beams 1. The draft is applied to the post 6.

The handles 8 are secured at their lower ends to the beams 1 about midway of their ends and are braced by uprights 9. A hopper 10 is supported by means of the handles and extends transversely of the machine and is provided with a series of discharge-openings in its bottom, which communicate with a chamber 11 beneath the hopper and containing the seeding mechanism. The hopper 10, chamber 11, and the seeding mechanism are of ordinary construction. Seed-cups 12 are located so as to receive the grain from the chamber 11, and each is subdivided by a partition 13, forming compartments, with which grain-tubes 14 communicate for conveying the seed into the drills or furrows. Flexible tubes 15, of hose-pipe, connect with the grain-tubes 14 and are stiffened by being enveloped in a wire coil 16, said flexible tubes bending and being movable with the adjustable side bars 17 and conveying the grain to the ground. Slotted arms 18 have adjustable connection with the side bars 17, and their outer ends are bent, as shown at 19, and formed with openings for the passage therethrough of the flexible tube 15. These slotted arms 18 can be moved in or out and turned horizontally, so as to properly position the delivery ends of the grain-tubes.

The side bars 17 have pivotal connection at their front ends with a cross-bar 20, secured to the beams 1 at an intermediate point, and are movable in and out at their rear ends. Curved bars 21 are connected at their outer ends with the side bars 17 and have their inner end portions overlapping and their opposing edges toothed and intermeshing with a pinion 22, secured to the lower end of a vertical shaft 23, to which is attached an operating-lever 24, by means of which the shaft 23 can be turned so as to move the curved bars and the pivoted bars 17 in opposite directions, either in or out, according to the required spread of the machine. A notched bar 25 has connection with the handles 8 and is curved concentrically with the shaft 23, and the lever 24 makes positive engagement therewith, so as to secure the lever and the pivoted bar 17 in an adjusted position, as will be readily understood. The toothed end portions of the curved bars 21 are retained in meshing relation with the pinion 22 by operating through a keeper 26, applied to the rear end portion of the main frame, and this keeper forms a guide and directs the bars 21 in their movements.

In my improved grain-drill I employ a series of hoes or drills, preferably five in number, to travel in the spaces between the rows of corn; but to sow the grain in the spaces around the cornstalks it is necessary to broadcast the seed, which end is attained by employing broadcast sowers and outside shovels arranged beyond the paths of the drills. The series of drills or hoes are indicated by the numerals 27 in the drawings, two of these drills or hoes being arranged in advance of the hopper and on opposite sides of the frame 1, the third drill or hoe being situated in the center of the machine and the two remaining drills or hoes arranged in rear of the preceding drills and outside of the paths thereof. Between the pairs of hoes or drills at the front and rear of the single central drill and in vertical planes beyond all of the drills I employ the two shovels, (indicated at 28.) The shovels are carried by standards which are pivotally attached, as at 28$^a$, to the machine-frame, and each shovel-standard is equipped with a break-pin 28$^b$, which fixes the positions of the shovels and holds them to their work under normal conditions. These break-pins are of wood, and they are adapted to fracture when the shovels meet an unyielding obstruction, thereby preventing serious injury to the machine or its shovels. A horizontal frame 29 is arranged beneath the main carrying-frame to be independent thereof when the carrying-frame 1 and the devices mounted thereon are raised or lowered more or less for the purpose of clearing the machine from accumulations of trash. This horizontal supplemental frame 29 is pivotally connected at its front end with the main carrying-frame, and at its rear end said supplemental frame is supported upon ground-wheels. The supplemental frame 29 is shown by Fig. 4 of the drawings as consisting of a single longitudinal beam 30 and two pairs of curved arms 31 32, the pair of arms 31 projecting from opposite sides of the beam in advance of the other pair of arms 32, said pairs of arms being of unequal length, as clearly represented by Fig. 4. The beam 30, which constitutes the main element of the horizontal frame 29, is slotted or bifurcated at its front end, as at 33, for the purpose of accommodating the front traction-wheel, by which the seed-dropping mechanism is actuated through the intermediate gearing heretofore described, and said forked or bifurcated front end of the beam 30 is pivotally attached, as at 34, to the adjustable main carrying-frame.

From the foregoing description it will be borne in mind that the drills or hoes are carried by horizontally-adjustable arms 17, which are pivotally attached to the bar 20 on the main carrying-frame, and said drills or hoes are fitted to adjustable slides 35 and 36 and to the central beam 30 in the manner represented by Fig. 4. The two front drills or hoes pass through openings 37 provided in the slides 35, which are adjustably attached to the short arms 31 of the horizontal frame. The two rear drills or hoes pass through similar openings 37 provided in the adjustable rear slides 36, which are operatively connected to the longer rear arms 32 of said frame, and the single central drill or hoe passes through the opening 38, which is formed in the beam 30 at a point between the two pairs of arms. These slides 35 and 36 are adjustable on the arms of the beam or frame to accommodate themselves to changes in the position of the drills or hoes when the arms 17 are moved inwardly to or outwardly from the single beam 30 of the machine, whereby the drills or hoes are sustained in operative relation to the other working parts of the machine, and provision is made for their ready adjustment with the pivoted arms 17. The adjustable slides 35 and 36 may be attached to the arms of the beam 30 in either of two ways, as represented by Figs. 4 and 8. In Fig. 4 each slide is shown as overlapping one arm of the beam, and it is adjustably confined thereon by a pair of cuffs 39, which embrace the arm and slide, and these cuffs are held in position to properly confine the slide in place by means of the bolts 40. This method of attachment is not strictly necessary, however, because in Fig. 8 I have shown the slide as provided with a longitudinal slot 41, through which passes the adjusting-wedge 42, said wedge fitting in a slot in the beam-arm and provided with fastening-pins 43.

In my machine I arrange certain of the flexible grain-tubes 14 to deliver to the drills or hoes which are carried by the laterally-adjustable arms or bars 17 on the main planter-frame 1; but two of these flexible tubes are arranged to broadcast the seed adjacent to the side shovels 28, thus distributing the seed broadcast around the cornstalks in a manner to be covered up by the action of the shovels 28, while the grain delivered by the other tubes to the drills or hoes is deposited in the furrow and covered by the falling of the soil inwardly over the furrow. It is well known that corn is generally planted in rows at intervals of from three feet eight inches to four feet apart, and my machine is well adapted for operation between rows of different widths, because the shovels and grain-drills are mounted on the adjustable bars 17 and guided by the adjustable slides 35 and 36.

The supplemental clearer-frame is supported at its rear end by the ground-wheels 30ª, which are suitably journaled on an axle attached to the heel of the frame 29, and on said rear end of the supplemental frame 29 or the carrying-axle for these ground-wheels is mounted a means for giving to the main carrying-frame 1 and the working parts supported thereon a limited vertical adjustment sufficient to clear the drills and shovels from accumulations of trash, such as weeds, below the frame 29. In Fig. 3 of the drawings I have represented the main carrying-frame and its working parts as being raised somewhat above the horizontal plane of the clearer-frame 29; but the extent of adjustment of the clearer-frame is not material, because it is evident that the frame 1 may be raised more or less, according as it is desired to withdraw the shovels from the ground or to raise them far enough to clear obstructing matter. Under normal conditions the main carrying-frame is lowered parallel to and rests upon the clearer-frame 29 in the position shown by Fig. 2 of the drawings. The means for adjusting the main carrying-frame is shown in the drawings as a lever-frame 44, preferably of elbow or right-angular form and mounted upon the axle of the ground-wheel 30ª. The horizontal portion of the lever-frame 44 is adapted to engage with the under side of the rear end portion of the main frame 1, so as to elevate said main frame and the working parts mounted thereon, and the upright or handle portion of this elbow portion is adapted to engage with a curved bar 45, which extends rearwardly from a cross-bar connecting the handles 8. Suitable latch devices are mounted on the upright part of the lever-frame to make adjustable connection with the curved bar 45, and the rear portion of the main frame may thus be raised more or less to change the distance of the shovels and drills from the ground or to hold the shovels in an elevated position and out of action when moving the machine over the field from one place to another. The latch device is represented by the drawings as consisting of a latch 46, which is slidably fitted in the vertical portion of the lever-frame for engaging with openings or notches of the curved bar 45, so as to hold the main carrying-frame and its working parts in adjusted position.

The claims of this application are restricted to those features of the invention which involve the employment of the laterally-adjustable scrapers on the wheeled supplemental frame, the divided seed-cup, the specific means for effecting the lateral adjustment of the side bars from the vertical shaft, and the means for locking the lever-frame, as well as to such other features as are not disclosed in my companion application, Serial No. 707,379, filed March 1, 1899. The remaining features of construction and relative arrangement of parts not claimed herein are made the subject-matter of claims in the said companion application, Serial No. 707,379.

Having thus described the invention, what I claim is—

1. The combination with the main frame comprising laterally-adjustable drills, of a frame having the main frame movable vertically with reference thereto, and guide-slides having loose connection with the clearer-frame and movable laterally with the shovels, substantially as set forth.

2. The combination with the main frame provided with laterally-adjustable drills, of a clearer-frame having the main frame movable vertically relatively thereto, and guides having adjustable connection with the clearer-frame and movable laterally with said drills, substantially as set forth.

3. The combination with the main frame and bars pivoted thereto and movable laterally and bearing drills, of a clearer-frame having the main frame movable vertically with reference thereto, and guides connected with the clearer-frame and receiving the drills to be adjustable therewith, substantially as described.

4. In a corn-planter, the combination with a carrying-frame and the pivoted adjustable side bars carrying the hoe-tubes, of a common supply-hopper, a series of individual seed-cups supported by the hopper, a divided seed-cup also carried on the hopper, flexible tubes or hose leading from said individual and divided seed-cups to the individual hoe-tubes, and means for adjusting the pivoted bars laterally with respect to the main frame, substantially as described.

5. In a seed-drill, the combination of a clearer-frame having the adjustable guides, a main frame pivoted on the clearer-frame, the adjustable side bars pivoted to the main frame and carrying the hoe-tubes which are fitted loosely in the guides of the clearer-frame, a hopper, seeding mechanism between said hopper and the hoe-tubes, the toothed bars attached to the adjustable side bars, a vertical shaft having a pinion which meshes with the toothed bars, and means for adjusting and locking the vertical shaft, substantially as described.

6. In combination, a main frame supported at its front end, a clearer-frame having pivotal connection with the front end of the main frame and forming a support therefor, ground-wheels applied to the rear end of the clearer-frame for supporting it, a lever-frame mounted upon the axle of the rear ground-wheels and adapted to have its horizontal portion engage with the rear portion of the main frame, a bar extending rearwardly from the main frame, and means for adjustably connecting the vertical portion of the lever-frame with the said rearwardly-extending bar for holding the main frame at any required elevation, substantially as set forth.

7. In a grain-drill, the combination with a main carrying-frame having the seed-dropping mechanism and a supplemental wheeled frame upon which the main carrying-frame is mounted for a limited vertical adjustment, of laterally-adjustable bars attached to the main carrying-frame and provided with drills and shovels intermediate of said drills, slidable guides attached to the supplemental frame and receiving the drills to be adjustable laterally therewith, means mounted on the main carrying-frame and operatively connected with the bars for adjusting the same, and grain-tubes leading from the hopper of the said dropping devices and discharging to the drill-tubes, certain of said grain-tubes discharging the seed broadcast in relation to the shovels on said laterally-adjustable bars, substantially as described.

8. In a grain-drill, a supplemental horizontal frame provided with laterally-extending arms and slidable guides operatively fitted to said arms, in combination with a main frame, adjustable bars supported thereon, drills attached to said adjustable bars and fitted in the slidable guides of the supplemental frame, and means for adjusting the pivoted bars and the drills, substantially as described.

9. In a grain-drill, a horizontal supplemental frame provided with laterally-extending arms, perforated guides adjustably fitted to said arms, and clamps by which the guides are loosely confined in position on the arms of said frame, in combination with a main frame, the laterally-adjustable bars pivoted thereto and drills or hoes carried by said bars and fitted in the perforations of the guides, for the purpose described, substantially as set forth.

In testimony that I claim the foregoing as my own I have hereto affixed my signature in the presence of two witnesses.

WILSON W. MILLER.

Witnesses:
   E. B. PULLIAM,
   C. F. FOLEY.